United States Patent [19]

Vowles

[11] Patent Number: 5,537,913
[45] Date of Patent: Jul. 23, 1996

[54] CONTAINER FOR THE WOOD MATURATION OF WINES AND LIQUORS

[75] Inventor: Robert W. Vowles, Fitzroy, Australia

[73] Assignee: Intellection Pty. Ltd., St. Fitzroy, Australia

[21] Appl. No.: 256,437

[22] PCT Filed: Mar. 24, 1994

[86] PCT No.: PCT/AU94/00147

§ 371 Date: Jul. 6, 1994

§ 102(e) Date: Jul. 6, 1994

[87] PCT Pub. No.: WO95/00401

PCT Pub. Date: Jan. 5, 1995

[30] Foreign Application Priority Data

Jun. 18, 1993 [AU] Australia .............................. PL9466
Jul. 27, 1993 [AU] Australia .............................. PM0153
Jul. 27, 1993 [AU] Australia .............................. PM0154

[51] Int. Cl.⁶ .................................................. B65D 8/04
[52] U.S. Cl. ................................................. 99/277.1; 426/11
[58] Field of Search ........................ 99/275, 276, 277, 99/277.1, 277.2, 278; 426/7, 8, 11

[56] References Cited

U.S. PATENT DOCUMENTS

| | | | |
|---|---|---|---|
| 818,478 | 4/1906 | Shwayder | 99/277.1 |
| 2,017,235 | 10/1935 | Drew | 99/277.1 |
| 2,108,661 | 2/1938 | Farrier | 99/277.1 |
| 2,203,229 | 6/1940 | Nilsson | 99/277.1 |

*Primary Examiner*—Robert W. Jenkins
*Attorney, Agent, or Firm*—Jenkens & Gilchrist

[57] ABSTRACT

An improved container (45) for fermentation and/or maturation of liquid products such as wine or other liquors is disclosed comprising a liquid impervious outer wall defining a zone for retaining the liquid product and a plurality of tubes (1) manufactured from individual lengths (2) of a suitable wood in edge sealing contact, the tubes 1 having seal means at one or both ends co-operable with the liquid impervious outer wall such that the tubes extend through a substantial part of the zone retaining the liquid product whereby the liquid product surrounds each of the tubes (1) and air freely circulates within the tubes.

25 Claims, 9 Drawing Sheets

CONTAINER FOR THE WOOD MATURATION OF WINES AND LIQUORS

This invention relates to improvements in containers for the wood fermentation and/or maturation of wines and liquors.

In the making of many types of wine and liquor, it is usual, after completion of the vinification or distillation process, for a product to be matured in wooden containers. Most commonly, the wood used in the making of maturation containers is oak, either American white oak, oak sourced from particular forests in France, or oak from other parts of Europe. In the maturation of Scotch whisky, for example, barrels which have previously been used for the maturation of American Whisky or sherry are commonly used. Depending upon the type of product to be matured and the intended period of maturation, barrels of various sizes may be employed so that a given quantity of product may be exposed to a greater or lesser surface area of oak. Smaller barrels provide a greater surface area per unit volume of contents and are generally used where quicker maturation is required. The converse generally applies in the case of longer maturation periods.

The process of maturation is a complex one which is still poorly understood. Although various compounds may be leached from the wood, giving colour and flavour to the product, there is also a process of transpiration through the wood during which some part of the product, usually more volatile components, may be lost. It is thought that oxygen from the air, which is admitted in small but steady quantities as evaporation of the product occurs, may also play a pan in the maturation process.

Almost universally, oak containers for the maturation of quality wines and liquors are barrels made by cooperage methods developed many centuries ago. In the best accepted practice, oak logs are cut to the correct length for staves and convened by radial splitting so that the growth rings of the wood are more or less normal to the width and length of the piece of wood so produced. Where logs are convened mechanically, careful quarter sawing is necessary to achieve the same orientation of growth ring. The convened logs are then air seasoned for a minimum of two years. Attempts to accelerate the seasoning process through the use of kiln drying invariably result in a barrel of inferior quality which may spoil a product matured in it through leaching out of components of the tree sap trapped in the wood during the rapid drying process. Barrel staves must have the growth ring orientation referred to so that medullary rays (impervious layers in the wood), extend from edge to edge, ensuring that they are impervious to liquids, and that they do not warp which might result in barrel leakage.

After seasoning of the convened logs, the split or sawn pieces are cut to length, dressed to a suitable thickness and shaped. They are then convened by hand into barrels of desired size by skilled coopers. The process stages in producing a quality liquid tight barrel are lengthy, time consuming and because they can only be produced by skilled specialist coopers, are becoming increasingly more costly. Moreover, supplies of premium oak logs from the principal forests in France and other locations in Europe are limited and, as demand continues to grow, prices for the necessary oak continue to increase. The long wood seasoning process, which necessitates a cooperage keeping one to two years' consumption of converted wood, also adds to costs. The splitting of logs to convert them to barrel staves is also an inefficient and wasteful method of conversion. The making of staves and barrel heads and the process of assembling barrels is largely performed by hand and, as coopers are few and their craft a highly skilled one, labour thus constitutes a substantial part of the final cost of a barrel.

The operational life of a barrel varies considerably and depends greatly upon the product to be matured in it. In the maturation of some wines, barrel life may be as low as a single vintage, but normally three to four years with normal use. This may be extended for a year or so by scraping the inner surface of the staves to expose fresh wood. Barrels used for the maturation of sherry may be used for ten years or more and those used for whisky are repeatedly re-used and may have operational lives as long as 60 years. However, damage and deterioration does occur with time and it is usual for barrels to be repaired or reconstructed on a regular basis. The most common form of damage occurs when a full barrel is rolled over a pebble or projection in the floor, resulting in a cracked stave. Also common is splitting of the stave in which the bunghole is made, usually by over-driving of a bung.

Although, for instance, barrels for the maturation of whisky have an extended operational life, the need for their regular repair and reconstruction imposes a continuous requirement for the services of a cooperage. As maturation periods for whisky frequently extend beyond five years, large numbers of barrels are necessarily employed by distilleries with the resultant imposition of a not inconsiderable cost.

Particularly in the table wine making industry, the high cost of barrels imposes a considerable cost per bottle of wine produced. The result has been the introduction of undesirable practices in the making of barrels for this industry. Chief amongst these are kiln drying of wood and the inexpert sawing of logs in a way which is more efficient in terms of timber use but fails to maintain the required growth ring orientation. As described, these can result, respectively, in the spoilage of wine or the warping of barrel staves and resultant leakage. Additionally, in wineries producing products which sell at low prices, the cost of oak barrels has proven to be so prohibitive that resort has been made to direct oaking. This involves, during vinification or maturation, the insertion of sawn oak strips or planks or a quantity of small sanitised oak chips into barrels or vats, the leaching of flavour compounds therefrom producing an oak flavour in the wine produced.

An alternative maturation method developed over recent years is to produce a liquid impervious container from a material such as stainless steel and to provide means for mounting an array of oak planks within the container, that is, in use the oak planks are held within the wine being matured. Examples of such arrangements may be found in Australian Patent Specification Nos. 65549/86 and 53754/90, U.K. Patent Specification No. 21 81403 and U.S. Pat. Nos. 5,174,461 and 4,558,639. It is believed, however, that for the maturation process to be fully effective, it is necessary to have the product on one side of the wood and ambient air on the other and it is not sufficient merely to immerse a suitable wood in the product. The temperature and humidity of the ambient air outside the maturation container may also be important.

Another prior art proposal may be found in Australian Patent Specification No. 75387/91 which shows a barrel having walls made of stainless steel and opposed end panels made from oak. While such containers can be satisfactorily used, the maturation process occurs much more slowly than in conventional barrels because the surface area of oak in contact with the wine or liquor is much less than in conventional barrels. Moreover, it is clearly difficult to vary the percentage surface area of oak in contact with the wine or liquor because this is constrained by the construction format of the barrel.

U.S. Pat. No. 3,942,423 illustrates a still further proposal for maturation of wine or similar liquor wherein a container having a bottle like configuration with a narrow upwardly directed neck closed by a stopper which carries an elongated rod extending down into the interior of the container. The rod has an internal bore which is closed at its inner end and open at its end adjacent the stopper. While this arrangement may well work satisfactorily, it suffers from the same disadvantages as with AU 75387/91 discussed above in that the percentage surface area of the oak in contact with the wine or liquor is fixed within certain predetermined limits and cannot be varied above a fixed upper limit and certainly cannot approach or exceed that provided by conventional barrel technology. Additionally, the internal bore of the elongated rod is not readily ventilated.

The present invention aims at providing a form of liquid container construction for use in fermentation and/or maturation of wines or liquors which is less expensive than oak barrels of conventional construction but which does not have disadvantages in maturing the wine or liquor. A further aim is to provide a container construction as aforesaid in which it is possible to readily vary the ratio of surface area of wood in contact with a given volume of liquid up to or beyond that provided by a wooden barrel of conventional construction.

Still further preferred objectives of the present invention are to provide a container construction for wood fermentation and/or maturation of wines and liquors that is capable of providing all the normal maturation effects of a conventional wooden barrel; that can be machine-made with high efficiency and minimal labour component; in which the higher cost components have an unlimited service life; which allows for better efficiency in the conversion of saw logs to wood for the making of wooden components; which may reduce wood seasoning times; in which the process of toasting can be performed in a more precise way; in which the wooden components are more or less completely enclosed and therefore protected from contact damage; and, most importantly, which permits barrels to be serviced and, if necessary, the wooden components to be completely replaced in minimal time and with no requirement for skilled cooperage.

Accordingly, the present invention provides a container for use in fermentation and/or maturation of liquid products such as wines or liquors, said container having a liquid impervious outer wall defining an interior liquid holding zone and a plurality of tubes open to atmosphere at at least one end, said tubes being made from a suitable wood and located so as to pass at least partially through the interior liquid holding zone of said container whereby the liquid product being processed circulates around an outer surface of said tubes while air is free to circulate through or inside said tubes. Conveniently each said tube is formed by a plurality of separate wooden elements in edge contact to form a said tube of any desired regular transverse cross-sectional shape. Preferably, growth rings in each said wooden element are disposed so that at least one medullary ray traverses from side to side between longitudinal edges of said wooden element. Preferably said wooden elements are secured to one another by clamping or bonding with adjacent said longitudinal edges in sealing engagement.

In this way, the situation prevailing in a conventional barrel, in which the liquid product being matured is maintained on one side of a layer of suitable wood whilst ambient air circulates on the other, is recreated and the proper maturation process will therefore occur. Moreover, by varying the numbers and/or size of the tubes it is possible to adjust the surface area of wood in contact with the liquid relative to the volume of the liquid to a ratio more, less or equal to that of a conventional barrel as may be desired by a wine or liquor maker. Further, since the wooden elements used to form the tubes are substantially straight, the tubes and the container can be made using labour saving machinery whereby significant cost savings will be achieved relative to conventional wooden barrel manufacture. Finally, the maturation container of the present invention permits the use of wood in the tube construction which may not have been suitable for the bent staves used in conventional barrel construction thereby also achieving cost savings in the materials used.

In preferred arrangements, the ends of said wooden tubes may be sealingly attached to the liquid impervious outer wall of said container such that expansive movement between said container and said tubes may be accommodated without leakage occurring. The number of said tubes provided in said container and their external diameters are such that a given quantity of product is exposed to the same surface area of wood as that of a conventional barrel and, by making the length and/or diameter of said container larger to a relatively minor degree than that of a conventional barrel, the net storage capacity of said container can be made equal to that of a conventional barrel. Although the internal, air contact, surface area of said tubes would appear to be smaller than that of a conventional barrel of equivalent wetted area, in fact, this is not the case as a substantial pan of the external surface of a conventional barrel is obscured from contact with air by the barrel hoops.

The advantages provided by said arrangement are manifold. The first and most important is that the high-cost, metal part of said maturation container has an unlimited operational life and may be almost completely machine-made, and its said wooden tubes may also be machine made and may be installed in and removed from said maturation container without any requirement for skilled cooperage. All that is required is for said container to be opened, cleaned as required, unserviceable or depleted tubes withdrawn from their accommodation, new tubes installed in their place, and said container re-closed. This, for instance, would allow a winery to replace depleted oak at a substantially lower cost than the normal solution of purchasing new barrels. In a distillery, instead of it being necessary to have a skilled cooper dismantle a barrel for repairs before its re-use, an unskilled worker can quickly and easily replace defective tubes through the application of the process described above and said defective tubes may then be serviced at leisure.

Another important advantage is that the process of making long, narrow strips of wood can be fully automated, and the assembly of pluralities of said strips of wood into said wooden tubes is ideally suited for the application of mechanised or robotic devices. Also, the permanent or non-wooden part of said maturation container is adapted to be made by efficient, mechanised manufacturing processes. It is thus possible to contrive that labour constitutes only a very small component of the finished cost of said wooden tubes and of said maturation container as a whole.

A further advantage is that, as said wooden tubes are built up from a plurality of strips of wood which are considerably narrower than the average barrel stave, providing reasonable selection of wood stock is made and wood is properly quarter sawn, warpage and resultant leakage is much less likely to occur. This is particularly so where some form of edge location device, such as splining or complementary profiling, is employed to maintain adjacent edges of said wooden strips in accurate abutment. This permits sawlogs to be converted in a more efficient way, eliminating the need for inefficient conversion processes such as radial splitting. There is also no reason why short strips of wood may not be joined end to end using a suitable jointing process and the resultant longer lengths incorporated into said tubes. In this way, further efficiency in wood use is achieved. Additionally, as said wooden tubes are not structural, as is the case with barrel staves, and as they are protected from contact damage by being accommodated inside said maturation container, the strips of wood from which they are built up may be sawn substantially thinner than a conventional barrel stave. This provides greater economy of wood use and permits the more rapid seasoning of converted logs. Also, unlike the case with a conventional barrel, pressure within said maturation container acts to urge the edges of said strips of wood in said wooden tubes into more intimate abutment and thereby reduces the possibility of leakage.

Yet additional advantages are that the external surfaces of said wooden tubes may be more readily and more controllably subjected to toasting processes. And, during the maturation process, the ends of said wooden tubes may be wholly or partially closed off to limit access of oxygen to a product being matured. Alternatively, the surface area of wood to which a maturing product is exposed in a said maturation container may readily be reduced by the removal of one or more of said wooden tubes from said maturation container, the vacant said mounting bosses so produced being closed by suitable plugs. Alternatively, a heat exchanger may be installed in place of a removed tube and used to control must temperature during fermentation. Also, said tubes are considerably more convenient to store and transport than are conventional barrels and, if required, may be shipped broken down. Further, said strips of wood from which said wooden tubes are built up might be shipped alone and the other components of said wooden tubes obtained at and assembled together with said strips of wood at their destination. When said maturation container is not in use, said wooden tubes are readily removed from it and more conveniently stored in a sterile environment of controlled humidity than are complete barrels. A final advantage is that the arrangement of the preferred embodiment of said maturation container permits one or more of its said wooden tubes to be replaced without the necessity to first empty said maturation container.

The various aspects of the present invention will be more readily understood by reference to the following description of preferred embodiments given in relation to the accompanying drawings in which:

FIG. 17a is a partial longitudinal cross-sectional view of a modified form of wooden tube capable of use in the present invention;

FIG. 17b is a transverse sectional view of FIG. 17a;

Figure 1:
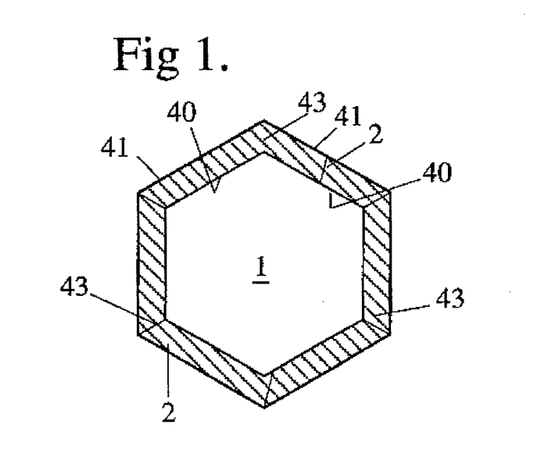
FIG. 1 is a transverse cross-sectional view of the preferred embodiment of said wooden tube.
Figure 2:
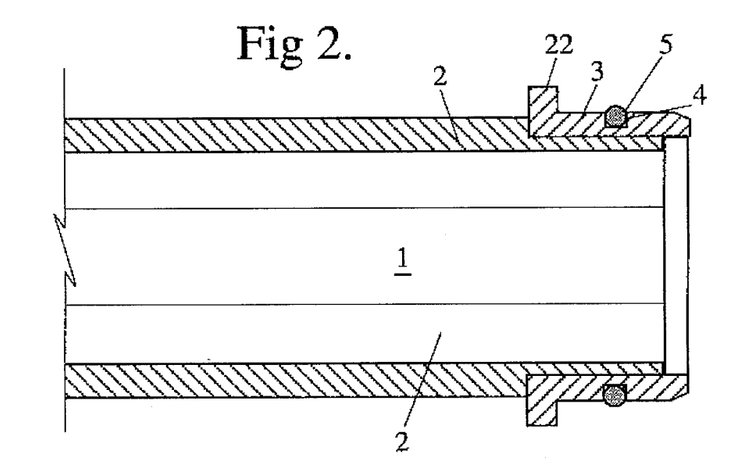
FIG. 2 is a longitudinal cross-sectional view of part of a said wooden tube.

With reference to FIGS. 1 and 2, wooden tubes 1 are provided, each built up from a plurality of long, narrow discrete strips of wood 2, in the embodiment depicted, six being employed. A sealing collar 3 is pressed onto each end of said wooden tubes, maintaining said strips of wood in sealing juxtaposition. Accommodated in circumferential groove 4 in each said sealing collar are sealing means 5. Conveniently, the transverse cross-sectional shape of said sealing collars is circular, but almost any regular geometric shape might be employed. Prior to said sealing collars being installed on the ends of said wooden tubes, wood is preferably but not necessarily removed from the outer surface of said wooden tubes at each end over a length approximately equal to the length of a said sealing collar to reduce the ends of said wooden tubes to a cross-sectional shape complementary to that of the inner surface of said sealing collars, and of such dimensions that a sealing interference fit is created between the inner surface of said sealing collars and the prepared outer surfaces of said wooden tubes when said sealing collars are pressingly installed in position. If required, a suitable sealant is provided between said sealing collars and the ends of said wooden tubes during the installation of said sealing collars. The inner surface 40 and the outer surface 41 of said strips of wood 2 may be planar or may be grooved or otherwise textured as desired to increase their effective air or liquid-contact surface area. In an alternative embodiment, during assembly of said strips of wood 2 into said wooden tubes 1, a suitable bonding and/or sealing material may be placed between their abutting edges 43 to bond or seal said strips of wood 2 one to another, the edges 43 of said strips of wood being urged into intimate contact with each other during setting of said bonding and/or sealing material. In a further alternative embodiment, said strips of wood 2 are passed between rollers of a suitable hard material, so that their edges are bruised and depressed. Preferably, the mode of said bruising is similar to that performed during the process of strip planking a boat and which is well known in the art; one edge of a wooden strip being bruised along a zone extending down its centre whilst its other edge is bruised along two zones either side of its centre. Thus, when the edges of two adjacent strips of wood 2 are brought into abutment, their respective deformations are complementary. When a said wooden tube so treated is installed in a maturation container and is wetted by the product being matured, said bruised wood swells to substantially regain its original shape, thus acting to provide a sealing of the joints between adjacent said strips of wood 2 from which said wooden tube 1 is built up.

Figure 3:
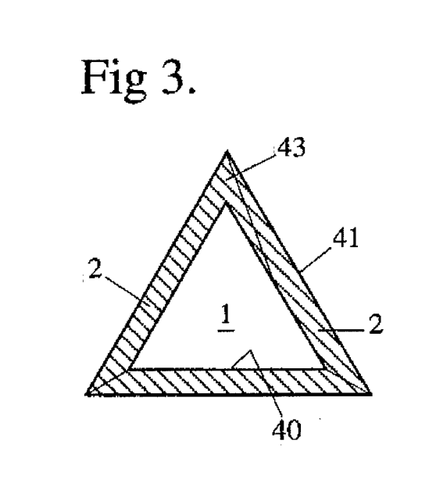
FIGS. 3, 4 and 5 are transverse cross-sectional views of alternative arrangements of said wooden tube.
Figure 4:
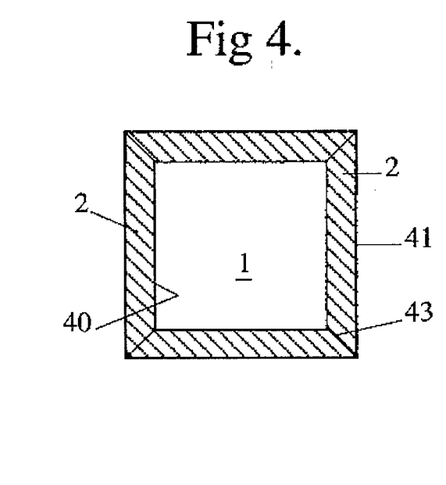
Figure 5:
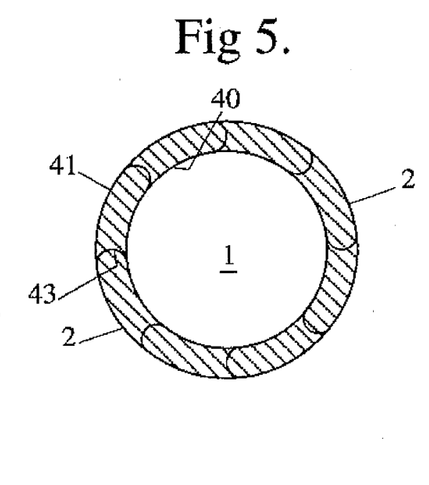

With reference to FIGS., 3, 4 and 5, alternative embodiments of said wooden tube are depicted, built up, respectively, from three, four and eight long, narrow discrete strips of wood 2.

Conventional wooden barrels intended for use more than once are normally made from wooden staves having a thickness usually in the range of 23 mm to 27 mm and often much thicker than this as each stave must be capable of forming a structural support for a filled barrel. In the present invention each wooden strip 2 need not be a structural member and it is preferred that the strips have a thickness in the range 10 mm to 22 mm, preferably 18 mm to 22 mm.

Figure 6:
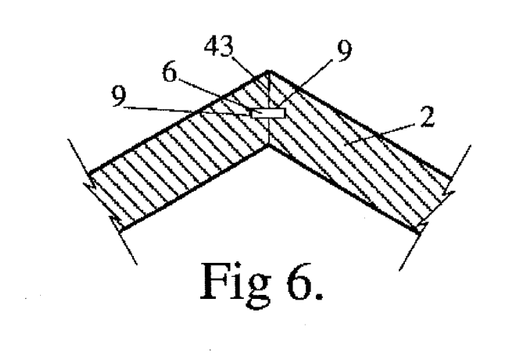
FIGS. 6, 7 and 8 are partial transverse cross-sectional views of means to locate the edges of said strips of wood in said tubes.
Figure 7:
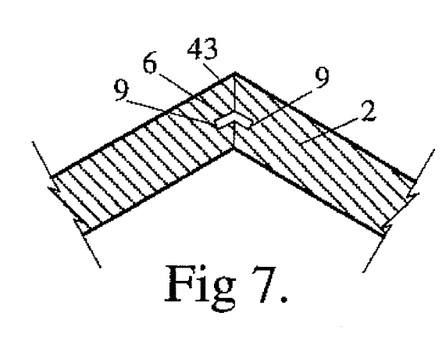

With reference to FIGS. 6 and 7, splines 6 are accommodated in grooves 9 formed along the edges 43 of said strips of wood 2 to maintain adjacent said edges 43 one to another in accurate abutment.

Figure 8:
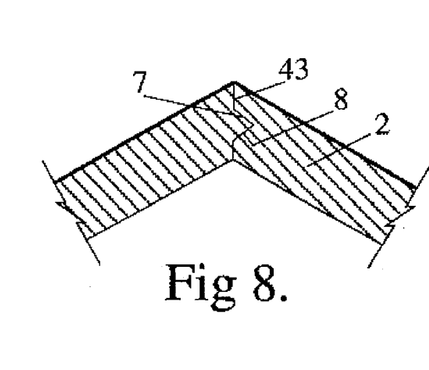

With reference to FIG. 8, in an alternative embodiment, a suitable raised shape 7 is formed along one edge 43 of a said strip of wood 2 to engage a complementary recess 8 formed along an adjacent edge 43 of a said strip of wood 2 to maintain said adjacent edges in accurate abutment.

Figure 9:
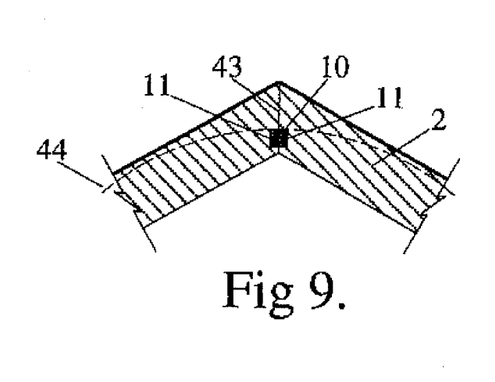
FIG. 9 is a partial transverse cross-sectional view of means to seal the edges of said strips of wood in said tubes.

With reference to FIG. 9, in an alternative embodiment, grooves 11 of suitable cross-sectional shape are formed along the edges 43 of said strips of wood 2 and sealing means 10 are accommodated within said grooves such that, when said strips of wood are assembled together, said sealing means are compressed and provide a positive seal between the edges 43. The position of the inner edge of sealing collar 3 as depicted in FIG. 2 is shown in broken line 44. The position of grooves 11 and therefore of sealing means 10 is such that, when a said sealing collar is installed on the end of a said wooden tube, its inner surface seals against said sealing means. In an alternative embodiment, prior to the assembly of strips of wood 2 into said tubes, grooves 11 are filled with a suitable thermoplastic sealing material. During the process of toasting the outer surfaces of said tubes, sufficient heat is conducted to said sealing material to cause it to melt and sealingly bond together adjacent edges of said strips of wood. With reference again to FIG. 5, abutting edges of said strips of wood may be made with a variety of complementary shapes and, in the preferred embodiment, these are part circular, as depicted, or so called birdsmouth in the form of a shallow V-shaped section.

Figure 10:
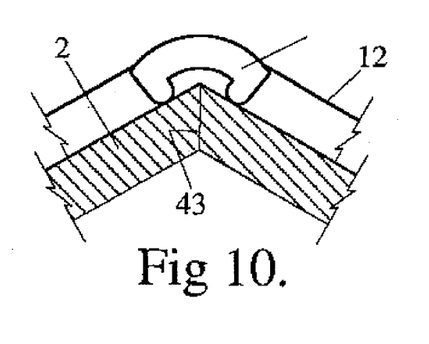
FIGS. 10, 11, 12 and 13 are partial transverse cross-sectional views of means to secure together said strips of wood in said tubes.
Figure 13:
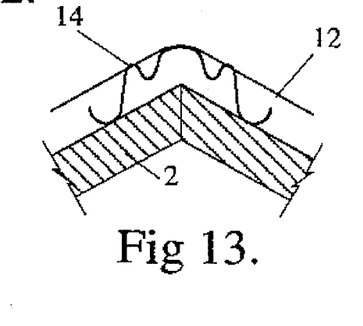

With reference to FIGS. 10 and 13, adjacent edges of strips of wood 2 in said wooden tubes are maintained in sealing abutment by the urging of tight circumferential wires or bands 12 which pass over shoes 13 or 14. Said wires or bands 12 and shoes 13, 14 are provided at suitable intervals throughout the length of a said wooden tube 1. Said shoes are either moulded from a suitable hard elastomer, as in 13, or made from spring sheet metal, as in 14. Said moulded shoe 13 might conveniently be made of polytetrafluoroethylene and said wires or straps and said spring sheet metal shoe of stainless steel or titanium, all substances which would not taint or react with the type of products to be matured in said maturation container 1. Both said types of shoe act to impose pressure at points 79 along a zone suitably removed from the immediate edges 43 of said strips of wood 2, as pressure applied at their immediate edges might, in fact, inhibit sealing abutment. Both said types of shoe 13, 14 are elastically deformed by the tension of said wires or bands 12 to an extent which allows them to accommodate without slackening all normal expansive and contractive movements in said wooden tubes.

Figure 11:
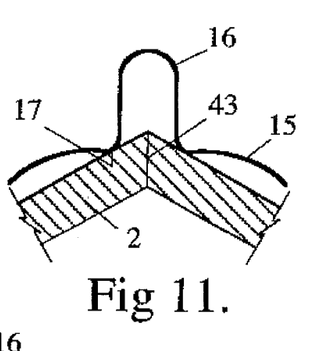
Figure 12:
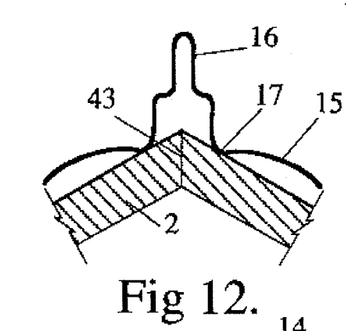

With reference to FIGS. 11 and 12, in an alternative embodiment, circumferential spring metal bands 15 are positioned at suitable intervals along the length of a said wooden tube, each said band being provided with a plurality of contact points 17 which, for the reasons previously stated, apply pressure to said strips of wood at points along a zone suitably removed from the immediate edges 43 of said strips of wood. Said spring metal bands are tensioned by deforming or crimping a projecting part 16 provided for the purpose, this being shown in its un-deformed state in FIG. 11 and in its deformed state in FIG. 12. Similarly, said spring metal bands are sufficiently elastic in their said deformed state to accommodate without slackening all normal expansive and contractive movements in said wooden tubes.

With further reference to FIG. 5, in this embodiment, in which the outer cross-sectional shape of said wooden tube approximates a circle, said wires or straps and shoes or said spring metal bands are replaced with simple, circumferential, tensioned wires, straps or bands. Conveniently, these might be one of the commercial metal banding systems, such as the Band-It system, which is well-known in the art. In arrangements which do not facilitate this, for instance, where the cross-sectional shape for a tube is hexagonal, but where the thickness of said wooden strips permits it, localised areas might be reduced to a round cross-sectional shape to allow such wiring, strapping or banding.

Figure 14:
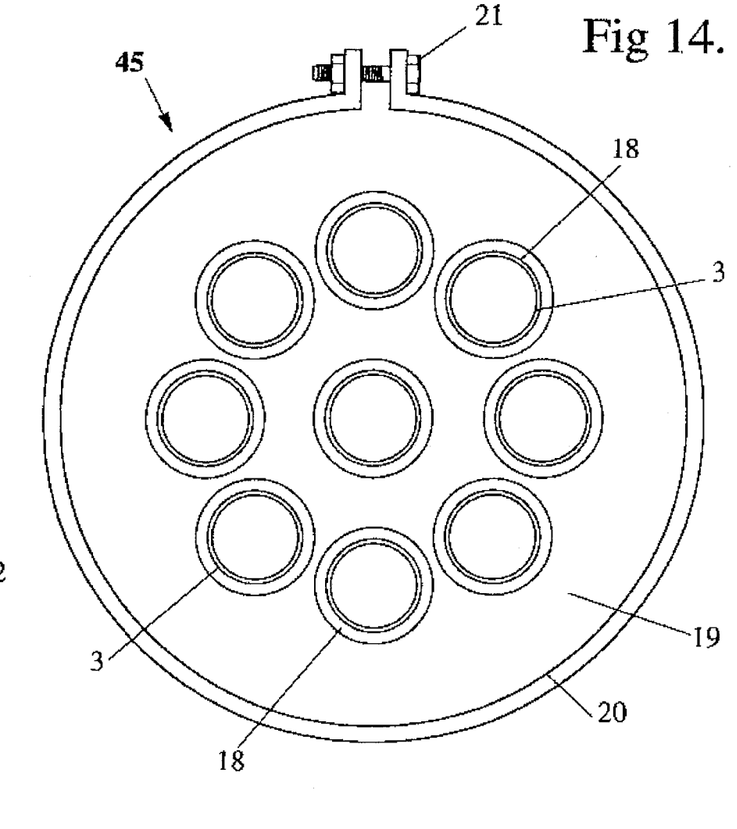
FIG. 14 is a view of the end of an assembled said maturation container.
Figure 15:
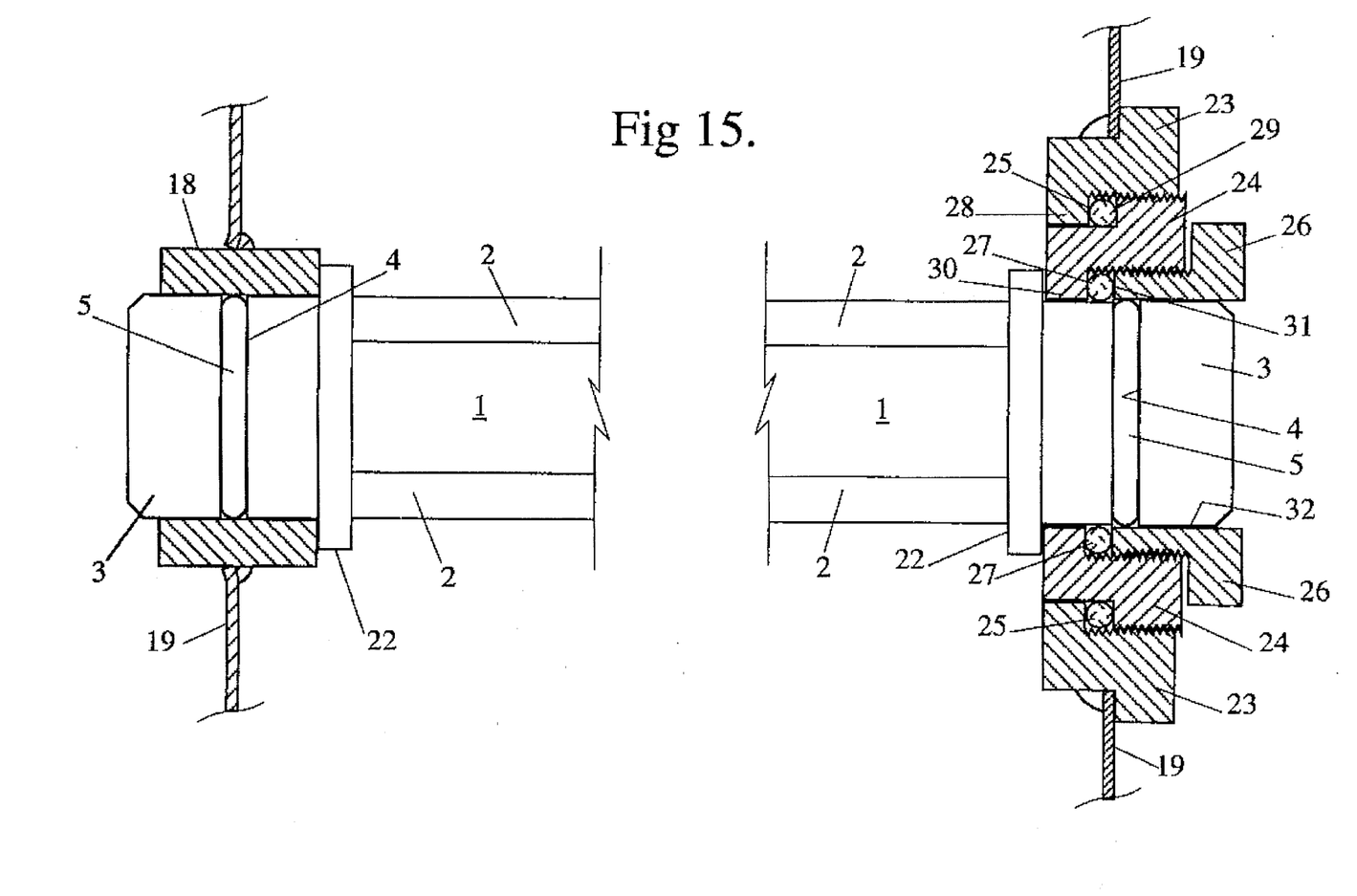
FIG. 15 is a partial longitudinal cross-sectional view of the ends of a said wooden tube installed in said maturation container.

With reference to FIGS. 14 and 15, a maturation or fermentation container 45 is provided having two more or less flat and parallel opposed walls 19. Mounting bosses 18 of equal diameter are mounted permanently in one or both walls 19 or, alternatively, mounting bosses 18 of one diameter are mounted permanently in one wall 19 and bosses 23 of larger diameter are mounted in the other wall 19 such that the axes of each pair of complementary mounting bosses 8,18 or 18,23 are collinear. In the final container, these axes may be horizontally or vertically disposed. In one preferred embodiment, said maturation container 45 comprises unitary cylindrical body part (not shown) permanently closed by a more or less flat wall (not shown) at one end and with a more or less flat removable sealing closure 19 at the other. In an alternative embodiment, removable closures of a similar type are provided at each end of said unitary cylindrical body part. In either case a clamping ring 20 and fastener 21 may be used to fix the or each removable wall 19 to the unitary body part. In further alternative embodiments, said maturation container body part is made with a transverse cross-section of any regular geometric shape. In yet a further alternative embodiment, said maturation container is made in two halves with a more or less square or rectangular cross-sectional assembled shape, each half being provided with a flat wall which is parallel to a complementary wall in the other. Bung holes, preferably adapted to receive threaded plugs, are provided in suitable positions in all configurations of the container 45.

Said mounting bosses 18,18 or 18,23 are adapted to sealingly accommodate sealing collars 3 fixed to the ends of said wooden tubes [and, in the preferred embodiment, are of a circular cross-sectional shape. In alternative embodiments, said mounting bosses are of other cross-sectional shapes complementary to said alternative cross-sectional shapes of said sealing collars 3. When a said sealing collar 3 is accommodated within a said mounting boss, sealing means 5 act to seal the one to the other such that no product stored within said maturation container can escape through said mounting boss. In the preferred embodiment, said sealing means 5 are made from a suitable material and are of the 'O' ring type well known in the art. In alternative embodiments, sealing means of any suitable type are employed. When a said sealing collar 3 is accommodated within a said mounting boss 18, flange 22 on said sealing collar acts to prevent excessive axial movement by abutting the inner face of said mounting boss 18.

In one preferred embodiment of container 45, to install said wooden tubes 1 in said container, mounting collars 18 are provided in both walls 19, and at least one of the walls 19 needs to be removable from the said unitary body part. The removable closure 19 is removed from said body part and said sealing collars 3 of said wooden tubes 1 are inserted for their full length into said mounting bosses 18 in the fixed end wall 19. If required, a suitable lubricant or sealant is applied to the outer faces of said sealing collars before installation of said wooden tubes commences. Said removable closure 19 is then reinstailed over the open end of said container 45, its said mounting bosses 18 receiving said sealing collars 3 at the other ends of said wooden tubes 1. The rim of the open end of said container 45 and the edge of said removable closure 19 are provided with complementary locating means to ensure that the axes of opposing pairs of said mounting bosses 18 are maintained collinear when said removable closure 19 is reinstailed over the open end of said container 45. In the preferred embodiment, said removable closure 19 is sealingly secured in position over the open end of said container 45 (FIG. 14) by the clamping ring 20 tightened by suitable tightening means 21. A gasket of suitable material (not shown) is provided between the rim of the open end of said container 45 and the inner face of the edge of said removable closure 19 to seal the one to the other and prevent any leakage of product from said container. In other alternative embodiments, said removable closure is sealed and fixed to the open end of said container 45 by any other suitable means.

With reference to FIG. 15, in an alternative embodiment, provision is made for the removal from and replacement in said maturation container of said wooden tubes without the necessity to open said maturation container. In this embodiment both end walls 19 may be permanently mounted to the body part of the container 45 (FIG. 14). This embodiment is particularly desirable where said container 45 is very large. In this embodiment, a container 45 is provided with fixed walls 19 with plain mounting bosses 18 in one wall 19 and complementary threaded mounting bosses 23 in the other wall 19, the axes of each complementary pair of mounting bosses being collinear. The internal diameter of said threaded mounting boss is large enough to admit flange 22 of sealing collar 3. To install a wooden tube 1 in said maturation container, it is inserted through threaded mounting boss 23 until sealing collar 3 on its inner end fully engages said plain mounting boss 18 and is sealed to it by sealing means 5 accommodated in groove 4. Retaining collar 24 is then screwed into said threaded mounting boss until sealing means 25 are compressed between shoulder 29 on said retaining collar and shoulder 28 on said threaded mounting boss, sealing the one to the other. Shoulder 30, when said retaining collar is screwed in to achieve satisfactory compression of sealing means 25, effectively imprisons said wooden tube in said maturation container by almost abutting the outer face of flange 22 but leaving sufficient clearance to accommodate expansive movement of said wooden tube or said maturation container. Sealing ring 26 is then screwed into said retaining collar until sealing means 27 are compressed between the outer face of shoulder 30 on said retaining collar and the inner face 31 of said sealing ring, sealing collar 3 to said retaining collar. When said sealing ring is screwed in to achieve satisfactory compression of sealing means 27, its inner face 32 is also sealed to sealing collar 3 by sealing means 5.

Obviously, the alternative embodiment depicted in the right-hand part of FIG. 15 could be replaced simply by an opening in the appropriate wall of said maturation container large enough to admit said wooden tube 1 and a plate provided with a plain mounting boss 18 and attachable to said wall of said maturation container to sealingly close said opening and thereby sealingly mount and imprison said wooden tube in said maturation container. Obviously, also, providing sealing collar 3 can be restrained from rotating during installation of a said wooden tube, retaining collar 24 and sealing ring 26 can be combined into a single piece which is screwed into threaded mounting boss 23 and sealed to it by sealing means 25 and sealed to sealing collar 3 of said wooden tube by sealing means 5.

Figure 16:
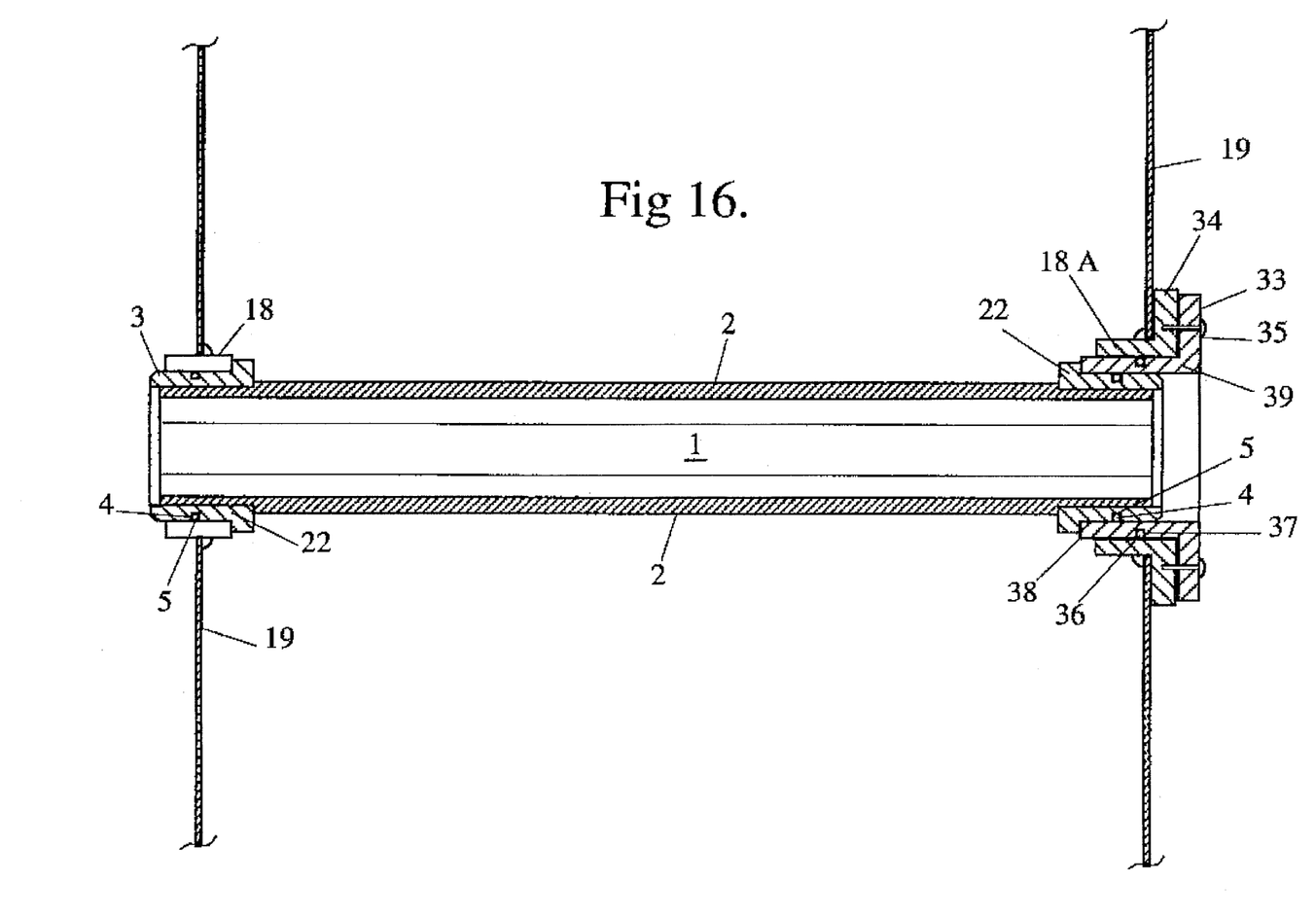
FIG. 16 is a partial longitudinal cross-sectional view of an alternate method of mounting a said wooden tube in said maturation container.

FIG. 16 illustrates a still further possible embodiment where the container 45 (FIG. 14)is made with pairs of collinear complementary mounting bosses 18 and 18A incorporated into more or less flat and parallel opposing walls or ends 19. Both of said mounting bosses 18, 18A have plain and parallel bores, one 18 with an internal diameter such as to just accommodate a sealing collar 3 on the end of a wooden tube 2 and the other 18A of an internal diameter such as to permit ingress of the whole of said tube with said sealing collars in place on its ends. A said wooden tube 1 installed in said container is retained in place by a retaining collar 39, the internal bore of which just accommodates sealing collar 3 on the end of said wooden tube and which is sealed to said retaining collar 39 by sealing means 5 accommodated in groove 4. Said retaining collar 39 is itself just accommodated in the larger mounting boss 18A and is sealed to it by sealing means 36 accommodated in groove 37. Said retaining collar 3 is secured in place by screws 35 passing through its flange 33 into flange 34 of said larger mounting boss. Excessive axial movement of said wooden tube in said container 45 is restrained by the outer axial face of flange 22 of one sealing collar 3 abutting the inner face of mounting boss 18 or the outer axial face of the other sealing collar 3 abutting the inner face 38 of retaining collar 39. Obviously, a wooden tube may be made with sealing collars 3 on its ends, the diameters of which are such as to just be accommodated within said larger and smaller mounting bosses 18 and 18A and with flange 22 being omitted from the larger said sealing collar, so that, when said tube is slideably installed in said container, sealing means 5 in each said sealing collar seal said sealing collars to said mounting bosses and said tube is retained in place by a clip, screw or the like connecting the larger said sealing collar to its complementary said mounting boss.

In operation, to remove a said wooden tube from said container, screws 35 are loosened and removed, allowing retaining collar 39 to be withdrawn from mounting boss 18A. Wooden tube 1 may then be withdrawn through the bore of mounting boss 18A. Installation of a replacement wooden tube is the reverse of this procedure, preferably with the replacement of sealing means 5 and 36.

Figure 17:
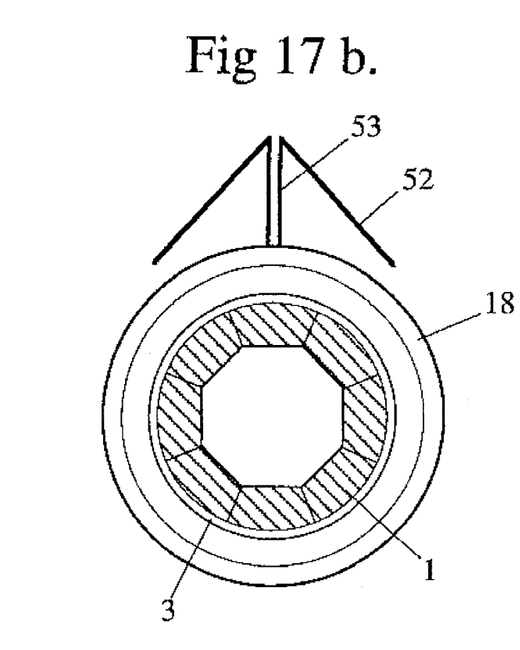

FIGS. 17a and 17b illustrate an arrangement useful with any of the embodiments disclosed herein when the wooden tubes 1 are, in use, disposed horizontally and the container 45 is used in the fermentation of wines. During the fermentation process, dead yeast cells (the lees) separate out and usually collect as a deposit at the lowest point of a barrel. Wine is "racked" or clarified after completion of the vinification process by gently syphoning it away from the settled lees. Where the tubes 1 are disposed horizontally, lees may accumulate upon their upper surfaces and be redispersed into the wine during racking. To resolve this problem, it is proposed to mount a lees deflector 52 vertically above each wooden tube 1. The deflector 52 having an inverted V shape in cross-section (FIG. 17b) and being formed by thin more or less rigid sheet material (preferably food grade stainless steel). Support rods 53 are located at either end and engage in sockets 54 formed in fixed mounting bosses 18 (or 18A, 23). Small air bleed holes 55 are provided along the apex of the deflector 52 to release air which might otherwise be trapped during filling of the container. The angle at the apex of the lees deflector 52 is selected such that lees are readily shed from the deflector and the width of the said deflector is such that the deflector fully shelters the tube 1 disposed beneath it. Moreover, when an arrangement as shown in FIGS. 15 or 16 is used, the width of said deflector must not be so great as to prevent its introduction (or withdrawal) through the larger mounting bosses 23 (or 18A).

Figure 18:
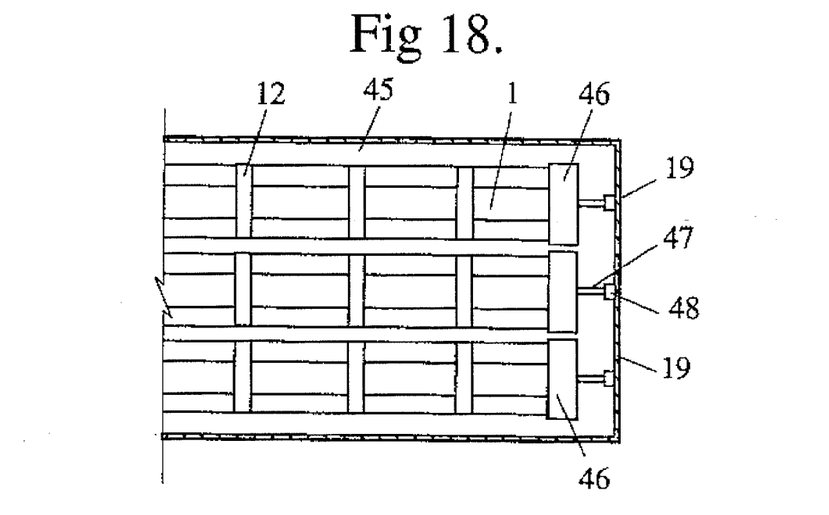
FIG. 18 is a partial longitudinal cross-sectional view of a modified form of container according to the present invention.
Figure 19:
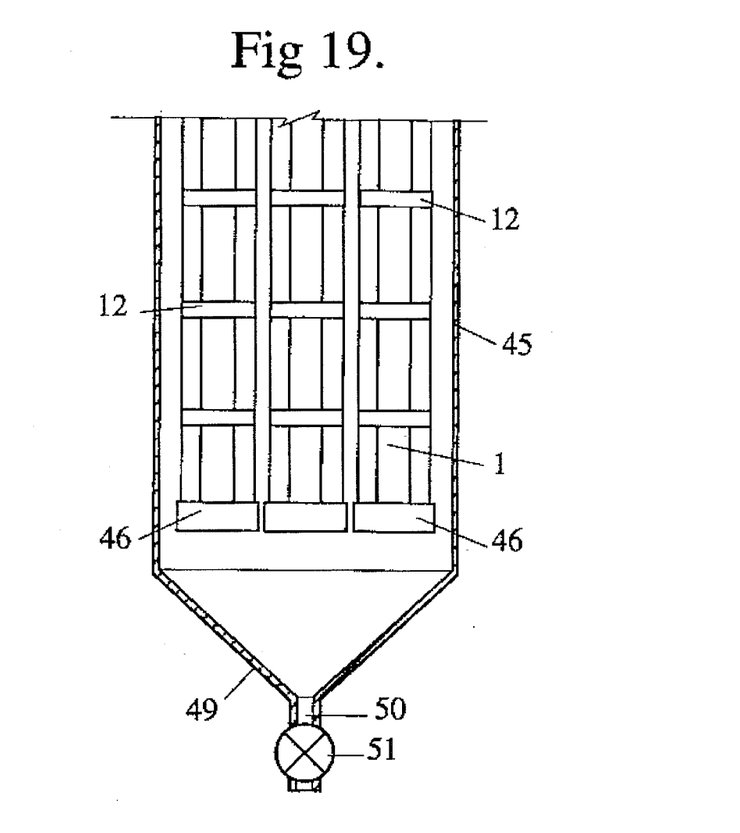
FIG. 19 is a partial longitudinal cross-sectional view of a still further modified form of container according to the present invention.

FIGS. 14, 15 and 16 illustrate embodiments where both ends of the wooden tubes 1 are open to permit circulation of ambient air therethrough to promote the maturation process. While these arrangements are preferred, FIGS. 18 and 19 illustrate possible alternative arrangements capable of achieving the objectives of the present invention. In FIG. 18 the maturation container 45 of stainless steel or some other suitable liquid impervious material is provided with wooden tubes 1 built up from wooden strips 2 as described with reference to earlier embodiments which are held together by clamping bands 12 (or any other means as described earlier). Sealing collars 3 such as described earlier are provided on the open, mounting ends of the tubes 1 (not shown) cooperating with bosses 18, 18A or 23 as earlier discussed such that the tubes 1 are open to ambient air at their open, mounting ends (not shown). Sealing caps 46 are provided and may incorporate supporting rods 47 which engage in bushes 48 fixed to the end wall 19 of the container 45. The end caps 46 seal and close the inner ends of the tubes 1 such that ambient air circulates therethrough only from said open, mounting end. This arrangement would generally be employed with the tubes 1 in a generally horizontal configuration.

The arrangement of container 45 shown in FIG. 19 would be normally arranged with the tubes 1 disposed vertically. The lower end of the container 45 includes a conical section 49 provided at its lowest point with a lees drain 50 closed by a valve 51. In this embodiment the inner ends of the tubes 1 are also closed by sealing caps 46 but in this case because the tubes 1 are vertically disposed, support for the inner tube ends is not required. Lees (dead yeast cells) would accumulate during the fermentation process in the conical lower end 49 and, at the appropriate time, be released through drain 50 and valve 51. This would obviate the need to rack wine in the conventional way to syphoning it away from the lees. The arrangements disclosed in FIGS. 18 and 19 would allow the use of shorter tubes 1 in barrels of standard length. This is an important advantage as shorter length wood is less expensive than a normal length such as that which would be used in an equivalent conventional barrel.

In the various embodiments described, said body part, said removable closure and said mounting bosses may be made from stainless steel, which may be glass-lined as required, and said sealing collars from stainless steel, titanium, polytetrafluoroethylene, polypropylene, polyethylene or other suitable material. In an alternative embodiment, said mounting bosses may be made from polytetrafluoroethylene, polypropylene, polyethylene or other suitable material and pressed into said walls and said removable closure of the container. In a further alternative embodiment, said body part, said removable closure and said mounting bosses may be made from titanium, polytetrafluoroethylene, polypropylene, polyethylene or other suitable material. In yet further alternative embodiments, all parts of said maturation container exposed to a product to be matured in said container may be made from other materials which will not taint or otherwise adversely affect that product.

Obviously, the surface area of wood to which a product is exposed in a container may be reduced by the removal of one or more of said wooden tubes from said container, the vacant said mounting bosses so produced being closed by suitable plugs (not shown).

In the preferred embodiment of container, it is possible to remove and replace a wooden tube in a full container with the loss of only a very small amount of product. In this procedure, the container is supported with its said tubes oriented vertically with said removable closure uppermost and such that access is available to the outer openings of said mounting bosses at its lower end. Said clamping ring is then loosened and said removable closure removed. A suitable plug is then offered up to the appropriate said lower mounting boss outer opening and is pressed into position in said mounting boss to sealingly close it off as the appropriate said wooden tube is withdrawn upwardly so that its said sealing collar disengages from said mounting boss. A suitable plug is then installed into said sealing collar at one end of a replacement said wooden tube and the plugged end is passed down through the product contained in said container so that its said sealing collar engages and seals to the appropriate lower said mounting boss, the plug in said mounting boss being displaced as this occurs. Said removable closure is then reinstailed on said container, the said sealing collars on the ends of said wooden tubes engaging and sealing to said mounting bosses in said removable closure. Said clamping ring is then retightened to maintain said removable closure in place on said container. Said plug in the end of said sealing collar of said replacement wooden tube is then removed. A similar procedure may be followed with the arrangement of container depicted at FIGS. 15 and 16, excepting that, in order to be able to remove a wooden tube, it is merely necessary to first remove its said retaining collar rather than to remove said removable closure.

To ensure temperature stability of the contents of said container, said container may be insulated by a bonded coating of suitable insulation material or by its being enclosed in a removable jacket of a suitable insulating material.

Figure 20:
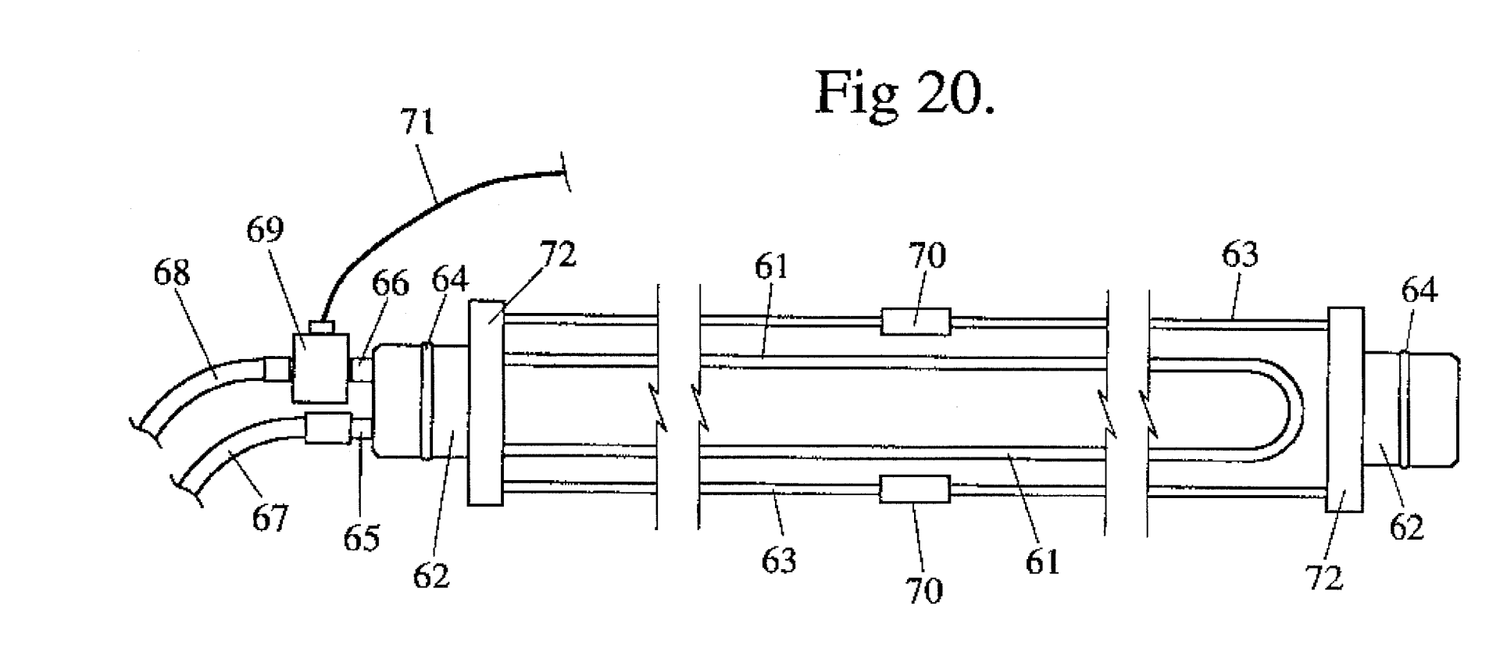
FIG. 20 is a longitudinal view of a heat exchanger means capable of installation in arrangements illustrated in preceding Figures.
Figure 21:
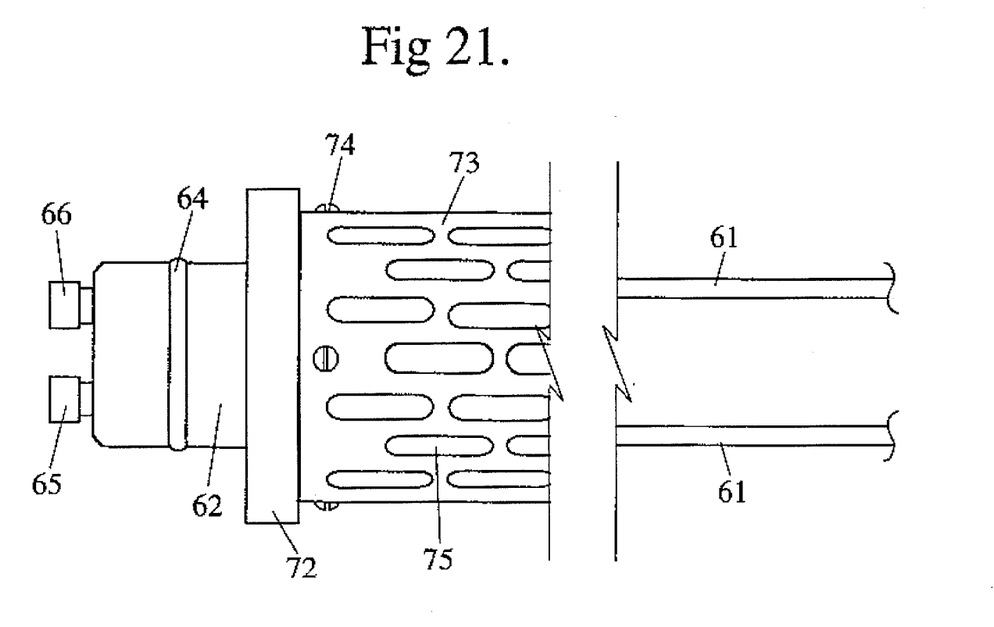
FIG. 21 is a partially cut away, longitudinal view of an alternative to the arrangement shown in FIG. 20.
Figure 22:
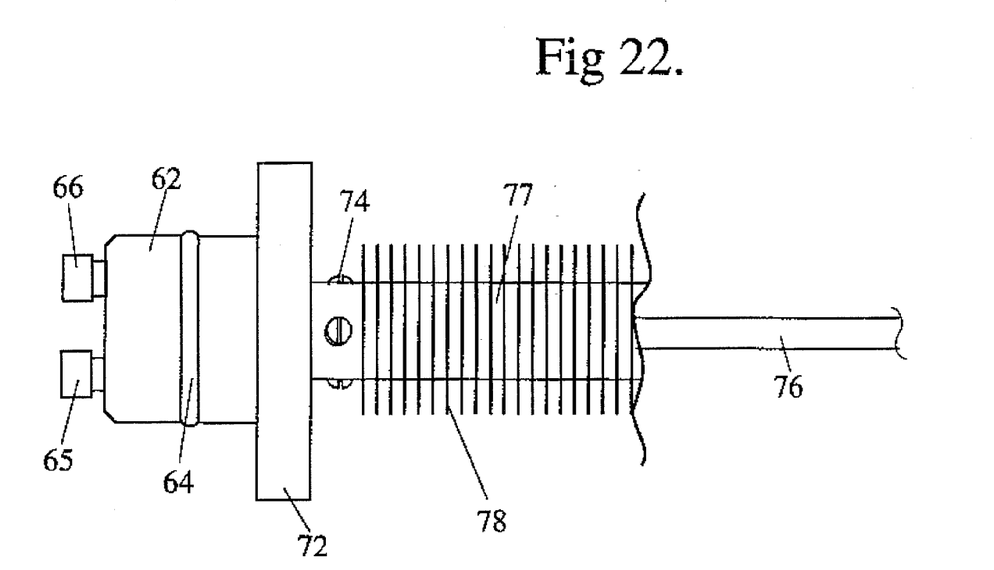
FIG. 22 is a partially cut away, longitudinal view of a still further possible arrangement to that which is shown in FIG. 20.

In an alternative preferred embodiment shown in FIGS. 20, 21 and 22, a heat exchanger means may be provided capable of being installed in containers described in previous Figures. In FIG. 20, the heat exchanger unit is made comprising conduits 61 which incorporate heat absorption or dissipation surfaces and are sealingly attached to and supported between end parts 62 homologous with and having the same size, shape, positional relationship and orientation as the sealing collars on the ends of the wooden tubes shown and described with reference to earlier Figures. Said end parts 62 are held in a fixed positional relationship by support means comprising, in the preferred embodiment, one or more, more or less rigid rods or struts 63 which allow free circulation of the must around said heat absorption or dissipation surfaces. Said end parts 62 are provided with sealing means 64 similar to those on the sealing collars on the ends of the wooden tubes 1. Provision is made to dismantle the principal components of the heat exchanger unit to allow their cleaning. In the preferred embodiment, the heat exchanger unit is dismantled by separating two halves of said support means 63 by unscrewing collars 70, permitting the ends of said conduits to be detached from said end parts. In an alternative embodiment (not shown), said support means 63 are made with opposite handed threads at each end and are screwed into flanges 72 in each said end part. One said end part is provided with fittings 65, 66 to permit the connection to them and thence to said conduits of supply and discharge lines 67,68 through which a heating or coolant fluid is supplied, preferably through a thermostatic flow control valve 69. Fittings 65,66 communicate with said conduits through suitable ducts (not shown) passing through said end part 62. Capillary line 71 passes into the interior of the container through a bung or other form of closure and connects said thermostatic flow control valve 69 to a bulb (not shown) suitably positioned in the must in the container, and pressure transmitted from the bulb acts to control said thermostatic flow control valve 69 to regulate the flow of said heating or coolant fluid through said conduits. Obviously, in an alternative embodiment (not shown), said heating or coolant fluid may be made to enter said heat exchanger unit at one said end part 62 and exit at the other. Said heat exchanger unit is adapted to replace a said wooden tube described earlier with reference to other Figures and thereby be used to control the temperature of must fermenting in said composite container of said original invention.

In operation, said composite container is opened and said heat exchanger unit installed in place of one said wooden tube. Said composite container is then closed and filled with must for fermentation through a bunghole or other access opening in its top. Supply and discharge lines 67,68 are connected to fittings 65,66 and thermostatic flow control valve 69 is adjusted to maintain the desired temperature. The bulb (not shown) attached to the end of capillary line 71 is suitably positioned inside the container, said capillary line passing into said composite container through said bung or other closure closing said bunghole or access opening. A heating or coolant fluid of a suitable temperature is then circulated through said heat exchanger unit through said supply and discharge lines until the process of fermentation is complete.

With reference to FIG. 21, in an alternative preferred embodiment of the invention, end parts 62 are maintained in a fixed positional relationship by support means 73 consisting of a single tube pierced by foramina 75 of sufficient size to allow a free circulation of must around heat dissipation or absorption surfaces 61. Preferably, the ends of said support means pass over bosses (not shown) formed on the inner faces of said end parts and are attached to said bosses by means of screws 74. The operation of this embodiment is the same as that of the embodiment depicted in FIG. 1.

With reference to FIG. 22, in a further alternative preferred embodiment of the invention, end parts 62 are maintained in a fixed positional relationship by rigid conduit 77 in a concentric arrangement with rigid conduit 76 such that the annular space between said conduits is sufficient to allow a suitable residence time for said heating or coolant fluid passing therethrough. The outer surface of outer conduit 77 is provided with fins 78 to provide additional heat dissipation or absorption surface. One end of said inner conduit is screwed into a boss (not visible) formed on the inner face of one said end part and the other open end of said inner conduit stops a suitable distance short of the inner face of a boss formed on the inner face of the other complementary said end part. The ends of said outer conduit pass over said bosses and are secured to them by screws 74. A duct (not shown) formed in end part 62 passes from inlet fitting 66 to inner conduit 76 and a similar duct (not shown) passes from the annular space between said inner and outer conduits to exit fitting 65. Operation of the arrangements shown in FIGS. 21 and 22 may be essentially similar to that described above with reference to FIG. 20.

To ensure that said metal body part of said maturation container is able to sustain the forces imposed upon it when it is filled and placed in supporting racks or rolled along the floor, zones in said metal body part at which said forces are applied are suitably protected or strengthened. Conveniently, said protection or strengthening takes the form of a reinforcing strip of a suitable material passing around the circumference of said metal body part.

I claim:

1. A container for use in fermentation and/or maturation of liquid products such as wines or liquors, said container having a liquid impervious outer wall defining an interior liquid holding zone and a plurality of tubes open to atmosphere at one end, each of said tubes being formed from a plurality of separate, longitudinally, disposed wooden elements in longitudinal edge sealing contact, each said tube further being located as to pass at least partially through the interior liquid holding zone of said container whereby the liquid product being processed is located around an outer surface of said tubes while air is free to circulate through or inside said tubes.

2. A container according to claim 1, wherein each said tube has a substantially uniform transverse cross-sectional configuration along the length of said tube within said container.

3. A container according to claim 2, wherein each said wooden tube is formed from a plurality of separate, longitudinally disposed wooden elements in longitudinal edge sealing contact.

4. A container according to claim 1 or claim 3, wherein the transverse cross-sectional configuration of each said wooden tube is circular or polygonal in shape.

5. A container according to claim 1 or claim 3, wherein growth rings in each said wooden element of each said wooden tube are disposed so that at least one medullary ray traverses fully between longitudinal edges of each said wooden element.

6. A container according to claim 1 or claim 3, wherein said wooden elements of each said wooden tube are secured to one another by clamping and/or bonding.

7. A container for use in fermentation and/or maturation of liquid products such as wines or liquors, said container having a liquid impervious outer wall defining an interior liquid holding zone and a plurality of tubes open to atmosphere at both opposed ends, said tubes being made from a suitable wood and located to pass fully through the interior liquid holding zone of said container whereby the liquid product being processed is located around an outer surface of said tubes while air is free to circulate through an interior volume of said tubes.

8. A container according to claim 7, wherein each said tube has a uniform transverse cross-sectional configuration along the length of said tube within said container.

9. A container for use in fermentation and/or maturation of liquid products such as wines or liquors, said container having a liquid impervious outer wall defining an interior liquid holding zone and a plurality of tubes open to atmosphere at least one end, each of said tubes being formed from a plurality of separate longitudinally disposed wooden elements in longitudinal edge sealing contact whereby the transverse cross-sectional configuration of each said is substantially uniform along the length of said tube within aid container, each said tube being further located so as to pass at least partially through the interior liquid holding zone whereby the liquid product being processed circulates around an outer surface of said tubes within said container while air is free to circulate through or inside said tubes, mounting means for each said tube defining a tube receiving opening through said liquid impervious outer wall, said mounting means permitting a said tube to be removed and replaced either by the same tube, a similar said tube or by closure means adapted to sealingly close said tube receiving opening.

10. A container according to claim 9, further including seal means cooperable between a said mounting means and an end of a said tube received therein.

11. A container according to claim 9, wherein said tube mounting means in opposing sections of said impervious outer wall are made with equal diameters to accommodate the ends of said wooden tubes and at least one said opposing section is made removable to facilitate removal and installation of said wooden tubes.

12. A container according to claim 9, wherein said tube mounting means in opposing sections of said impervious outer wall are made with unequal diameters to accommodate the ends of said wooden tubes.

13. A container according to claim 12, wherein an annular space between a said tube end and said mounting means of larger diameter is filled with a retaining collar.

14. A container according to claim 13, wherein said retaining collar is made plain and unthreaded and is pushed into position and secured in place with one or more fastening members.

15. A container according to claims 13 or 14, wherein said retaining collar incorporates sealing means such that limited axial movement between said mounting means and said tube end is accommodated without leakage occurring from said container.

16. A liquid fermentation and/or maturation tube for use with a container having opposed liquid impervious walls, said container being for fermentation and/or maturation of liquid products such as wines or liquors, said tube being open at least one end and comprised of a plurality of separate, longitudinally disposed wooden elements with adjacent said elements in longitudinal edge sealing contact, means located at opposed longitudinal ends of said tube adapted, in use, to engage in a respective said mounting means in the opposed liquid impervious walls of the container enabling sealing of said opposed longitudinal tube ends in said mounting means.

17. A liquid fermentation and/or maturation tube for use with a container having opposed impervious outer walls and tube mounting means located in said opposed liquid impervious walls, said container being for fermentation and/or maturation of liquid products such as wines or liquors, said tube being open at least one end and comprised of a plurality of separate, longitudinally disposed wood elements with adjacent said elements in longitudinal ends of said tube adapted, in use, to engage in a respective said mounting means in the opposed liquid impervious walls of the container enabling sealing of said opposed longitudinal tube ends in said mounting means.

18. A liquid fermentation and/or maturation tube for use with a container having liquid impervious walls and tube mounting means located in at least one of said liquid impervious walls, said container being for fermentation and/or maturation of liquid products such as wines or liquors, said tube being comprised of a plurality of separate longitudinally disposed wooden elements with adjacent said elements in longitudinal edge seal contact, means located at a first open longitudinal end of said tube adapted, in use, to engage with the mounting means in the liquid impervious wall of aid container enabling sealing of said first open longitudinal end of said tube adapted, in use, to engage with the mounting mans in the liquid impervious wall of said container enabling sealing of said first open longitudinal and in said tube mounting means, and closure means co-operable with a second longitudinal end of said tube opposed to said first open longitudinal end to prevent ingress of liquid into said tube from said second longitudinal end.

19. A tube according to claim 17 or claim 18, wherein growth rings in each said wooden element are disposed such that at least one medullary ray traverses fully between longitudinal edges of each said wooden element.

20. A tube according to claim 17 or claim 18, wherein said wooden elements are secured to one another by clamping and/or bonding with adjacent said longitudinal side edges in sealing engagement.

21. A container for use in fermentation and/or maturation of liquid products such as wines or liquors, said container having a liquid impervious outer wall defining an interior liquid holding zone and a plurality of tubes open to atmosphere at least one end, said tubes being made from a suitable wood and located so as to pass at least partially through the interior liquid holding zone of said container whereby the liquid product being processed circulates around an outer surface of said tubes while air is free to circulate through or inside said tubes, and seal means cooperating between said liquid impervious outer wall of said container and said at least one end of each said tube such that limited axial movement between said at least one end of each said tube and said container is accommodated without leakage occurring from said container.

22. A container according to claim 9 or claim 21, wherein both axial ends of each said tube are open to atmosphere.

23. A container according to any one of claims 7, 9 or 21, wherein, when said container is in use, said tubes are disposed in a substantially vertical position.

24. A container according to any one of claims 1, 7, 9 or 21, wherein, when said container is in use, said tubes are disposed in a substantially horizontal position.

25. A container according to claim 24, further including a deflector surface or surfaces disposed above each said tube.

\* \* \* \* \*

UNITED STATES PATENT AND TRADEMARK OFFICE
CERTIFICATE OF CORRECTION

PATENT NO. : 5,537,913           Page 1 of 2
DATED : Jul. 23, 1996
INVENTOR(S) : Vowles It is certified that error appears in the above-indentified patent and that said Letters Patent is hereby corrected as shown below:

| | |
|---|---|
| Column 1, line 31 | Replace "pan" With --part-- |
| Column 1, line 37 | Replace "convened" With --converted-- |
| Column 1, line 39 | Replace "convened" With --converted-- |
| Column 1, line 41 | Replace "convened" With --converted-- |
| Column 1, line 52 | Replace "convened" With --converted-- |
| Column 1, line 54 | Replace "convened" With --converted-- |
| Column 2, line 52 | Replace "21 81403" With --2181403-- |
| Column 4, line 28 | Replace "pan" With --part-- |

UNITED STATES PATENT AND TRADEMARK OFFICE
CERTIFICATE OF CORRECTION

PATENT NO. : 5,537,913 Page 2 of 2
DATED : Jul. 23, 1996
INVENTOR(S) : Vowles

It is certified that error appears in the above-indentified patent and that said Letters Patent is hereby corrected as shown below:

Column 8, line 29    Replace "8,18"
  With --18,18--

Column 9, line 11    Replace "reinstailed"
  With --reinstalled--

Column 9, line 18    Replace "reinstailed"
  With --reinstalled--

Column 12, line 25   Replace "reinstailed"
  With --reinstalled--

Column 14, line 9    Replace " longitudinally, disposed"
  With -- longitudinally -disposed--

Signed and Sealed this

Twentieth Day of May, 1997

*Attest:*

BRUCE LEHMAN

*Attesting Officer*         *Commissioner of Patents and Trademarks*